V. H. MEADOWS.
WATER SEAL FOR COOKING AND STERILIZING VESSELS.
APPLICATION FILED SEPT. 12, 1917.

1,290,771.  Patented Jan. 7, 1919.

Inventor
Vaughn H. Meadows
by
Edmund A. Strauss
Atty

UNITED STATES PATENT OFFICE.

VAUGHN H. MEADOWS, OF LOS ANGELES, CALIFORNIA, ASSIGNOR TO MRS. M. OLAH SMITH, OF LOS ANGELES, CALIFORNIA.

WATER SEAL FOR COOKING AND STERILIZING VESSELS.

1,290,771. Specification of Letters Patent. Patented Jan. 7, 1919.

Application filed September 12, 1917. Serial No. 191,076.

*To all whom it may concern:*

Be it known that I, VAUGHN H. MEADOWS, a citizen of the United States, residing at Los Angeles, in the county of Los Angeles and State of California, have invented new and useful Improvements in Water Seals for Cooking and Sterilizing Vessels, of which the following is a specification.

My invention relates more specifically to a means for effectually sealing the covers of cooking or sterilizing vessels, whereby steam generated therein may be confined.

It is an object of my invention to provide a novel form of water seal for cooking and sterilizing vessels, whereby the joint between a sterilizing or cooking vessel of ordinary construction and its cover may be effectually sealed to prevent the escape of steam generated therein, thereby utilizing all of the steam generated for the cooking or sterilizing operation.

It is a further object of my invention to provide a water seal construction, whereby a portion of the steam condensation within said vessel will be directed to and utilized by the water seal to renew the water contained therein which may evaporate during an operation of the apparatus.

I accomplish the above recited objects by means of the apparatus described herein and illustrated in the accompanying drawing, in which.

Figure 1:
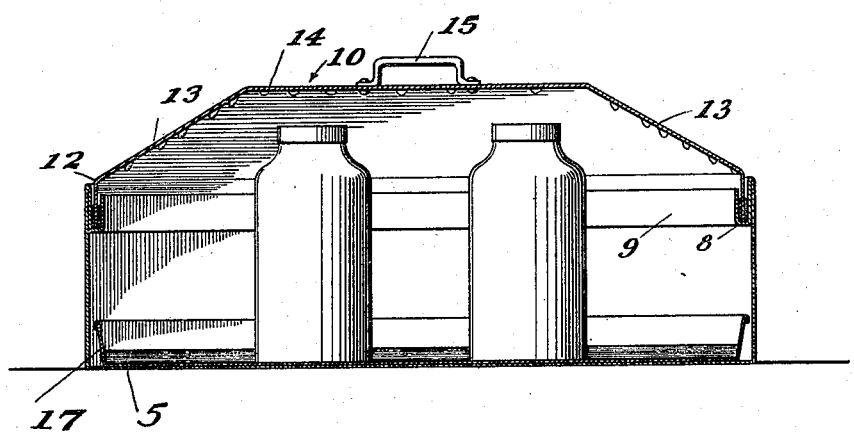
Figure 1 is a central vertical section through my apparatus.
Figure 2:
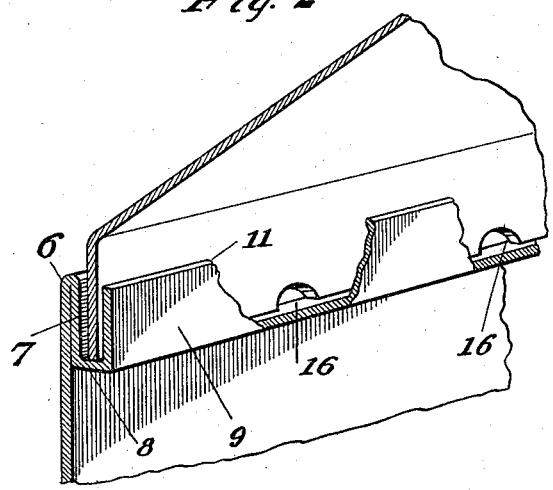
Fig. 2 is a perspective view of a portion of my apparatus illustrating the water seal construction.

Referring more particularly to the drawing, 5 designates a rectangular metallic structure formed of any suitable metal. The upper edges 6 of the vertical walls of said structure are bent downwardly as at 7, then outwardly as at 8, and upwardly as at 9 to form a trough-like structure extending completely therearound for the reception of the water that forms the seal between the structure 6 and its lid 10.

The upwardly extending wall 9 of the trough structure terminates adjacent the upper edge 6 a sufficient distance therebelow so that when the water in the trough rises to the rim 11 of wall 9 it will overflow into the chamber 5 of the vessel.

The cover 10 of the vessel preferably consists of an endless vertically disposed wall 12 having inclined walls 13 extending upwardly therefrom, said walls terminating in a flat horizontally disposed wall 14 to which wall is affixed a handle 15 of usual construction. The wall 12 is provided on its lower ends with a series of apertures 16 to permit the circulation of water on either side of the vertically disposed walls 12 of the cover when the same is in place on the vessel.

By providing inclined walls 13 on the cover the condensed steam arising during the operation of the apparatus will roll downwardly in the form of drops, and into the trough-like structure 8, thus replenishing the same from time to time during the cooking or sterilizing operation. By utilizing the condensed steam arising during the operation to replenish the evaporated water in the trough-like structure 8, I avoid the necessity of continually filling the trough on the evaporation of water therein.

The lower portion of the vessel is preferably provided with a tray 17, as clearly shown in Fig. 1, which is adapted to contain water used in the cooking or sterilizing operation, the cans of preserved food or other commodities being placed therein, as clearly shown in the drawing.

What I claim is:

A cooking and sterilizing apparatus, comprising a receptacle provided on its upper edges with an inwardly projecting water trough, the upper edges of the inner walls of which being lower than the upper edges of its outer walls, and a cover provided with a rim, the lower edges of which being adapted to rest on the bottom of the water trough and having a plurality of notches therein to permit the circulation of water on either side thereof, said cover having walls inclined downwardly toward said rim.

In witness that I claim the foregoing I have hereunto subscribed my name this 10th day of August, 1917.

VAUGHN H. MEADOWS.

Copies of this patent may be obtained for five cents each, by addressing the "Commissioner of Patents, Washington, D. C."